United States Patent [19]

McGarry

[11] Patent Number: 4,989,239
[45] Date of Patent: Jan. 29, 1991

[54] METHOD AND APPARATUS FOR PREVENTING PAY TELEPHONE FRAUD AND REDUCING HANDSET VANDALISM

[75] Inventor: Patrick J. McGarry, West Chester, Pa.

[73] Assignee: Mars Incorporated, McLean, Va.

[21] Appl. No.: 407,899

[22] Filed: Sep. 15, 1989

[51] Int. Cl.$^5$ .......................................... H04M 17/02
[52] U.S. Cl. .................................... 379/145; 379/146; 379/155
[58] Field of Search ................ 379/146, 145, 147, 155

[56] References Cited

U.S. PATENT DOCUMENTS 3,676,597  7/1972  Peterson .
4,039,768  8/1977  O'Maley .
4,845,742  7/1989  Staggs et al. ....................... 379/155
4,862,494  8/1989  Matheny ............................ 379/145

*Primary Examiner*—Stafford D. Schreyer
*Attorney, Agent, or Firm*—Davis Hoxie Faithfull & Hapgood

[57] ABSTRACT

A method and apparatus for the detection and prevention of pin fraud in a coin operated telephone is disclosed. A circuit detects loss of loop current and triggers the opening of a pair of switches thereby disconnecting the microphone from the phone. The A-relay is also switched to its refund and collect position. As a result, the fraud path through the microphone is disconnected, and the central office can perform all its control functions unimpaired. Thus, the incentives for perpetrating the fraud are eliminated.

18 Claims, 4 Drawing Sheets

METHOD AND APPARATUS FOR PREVENTING PAY TELEPHONE FRAUD AND REDUCING HANDSET VANDALISM

FIELD OF THE INVENTION

The present invention relates to improved method and apparatus for controlling the operation of coin operated telephones. More particularly, this invention relates to pay telephone control method and apparatus which prevent one widespread technique employed in the fraudulent operation of pay telephones which may be referred to as "pin fraud". As a result, the widespread vandalism of payphone handsets and the cables connecting payphones to their handsets should be significantly reduced.

BACKGROUND OF THE INVENTION

Coin operated telephone stations or payphones are interfaced with a central office by a three wire loop circuit, consisting of tip, ring and ground lines. In one type of commonly practiced fraud, known as "pin fraud", the wires in the handset of a payphone are manipulated so that the payphone's coin escrow bucket cannot be activated to collect or refund escrowed coins. In addition, this fraud causes the establishment of the initial rate needed for a local call. As a result, a vandal may make unlimited local calls without depositing any coins.

Furthermore, if customers deposit coins in a "pinned" telephone then these coins will collect in the escrow bucket. After the passage of time, the vandal returns to the pay telephone and reverses the fraud. Since the default mode of the phone is to refund coins sensed in the escrow bucket when no payment is due, the escrow bucket then releases the accumulated coins to the refund chute. The vandal takes the coins, thus defrauding the owner of the pay telephone. Thus, this fraud causes both a loss of revenues to the phone's owner, as well as customer dissatisfaction and ill-will when the customer does not receive a refund that he is entitled to such as when a call to the operator is made or the customer hangs up before the call is connected.

The method used to perpetrate this type of telephone fraud frequently causes damage to the pay telephone itself. The connecting cable and handset are often irreparably damaged by the vandal. This property damage is expensive to fix, both in terms of the costs of parts and labor. Many thousands of payphones, mostly in major cities, are damaged each year by vandals practicing this fraud. It is hoped that removing the incentive to practice this method of defrauding pay telephones will deter vandals from attempting it and thus keep them from damaging the telephones.

In the past, a fuse has been added to the telephone control circuit so that when a pin fraud is attempted the fuse blows. See U.S. patent application Ser. No. 07/199,129 filed May 26, 1989 and assigned to the assignee of the present invention. Firstly, the fuse thwarts the fraud by eliminating the possibility of unlimited free calls. Secondly, if a customer picks up the handset to make a call at a time when the fuse has been blown, he finds that the phone is not operational as no dial tone is heard. In this case, the customer will hopefully follow the operational instructions and not use the phone. Thirdly, and more importantly, if the customer inadvertently deposits coins with the fuse blown, they will be refunded to him, and will not be refunded to the vandal. Consequently, the incentive for performing the fraud is removed. However, the pay telephone is put out of service by the blown fuse and requires a service call to replace the fuse before the phone can be put back in service.

In an alternative prior art approach described in U.S. Pat. No. 4,845,742, one isolation transformer is used to isolate a receiver speaker element and a second isolation transformer is used to isolate a dynamic microphone. The use of an isolation transformer to isolate a receiver speaker was routinely used long prior to U.S. Pat. No. 4,845,742. See, for example, GTE, Coin Telephone Handbook, Section 476-201100 at p. 25/26, August 1978. Similarly, the use of an isolation transformer to isolate an audio input was also known prior to U.S. Pat. No. 4,845,742. See, for example, the isolation of the auxiliary audio input of FIG. 21 of U.S. application Ser. No. 199,129.

This well known isolation technique of using an isolation transformer cannot be used with a carbon microphone because such a microphone requires a DC bias to operate. Further, the use of an isolation transformer as shown in U.S. Pat. No. 4,845,742 requires that the microphone be isolated all the time. For testing the presence or absence of the handset or adjusting the volume of the speaker in the earpiece as taught in U.S. application Ser. No. 199,129, it is desirable to connect and disconnect the microphone at the appropriate times rather than to permanently isolate it.

SUMMARY OF THE INVENTION

It is therefore an object of the present invention to provide a simpler, more cost effective means to defeat pin fraud which does not always require a service call to put the pay telephone back into service.

It is a further object of the present invention to provide a means for defeating pin fraud which can be easily added to all types of existing pay telephones, including both electromechanical and electronic payphones.

Another objective of the present invention is to provide a means for defeating pin fraud which can be added as a retrofit to electronic pay telephones which presently incorporate the fuse method of prevention.

As more fully described below, the present invention provides a method and apparatus for thwarting pin fraud, and reduces a source of customer dissatisfaction with payphones.

In the prior art electronic telephone controller described in U.S. application Ser. No. 07/199,129 filed May 26, 1989, and assigned to the assignee of the present invention, circuitry exists to detect loss of loop current and as a result to trigger certain phone operations. As will be more fully described below in the detailed description of the invention, in one embodiment of the present invention, a ground path and two relay switches are added to the prior circuitry. These relay switches and a previously existing tip line switching relay are controlled to operate synchronously in order to thwart pin fraud by disconnecting the microphone of the handset from the remainder of the phone circuitry, when a loss of loop current is detected.

DETAILED DESCRIPTION

Figure 1:
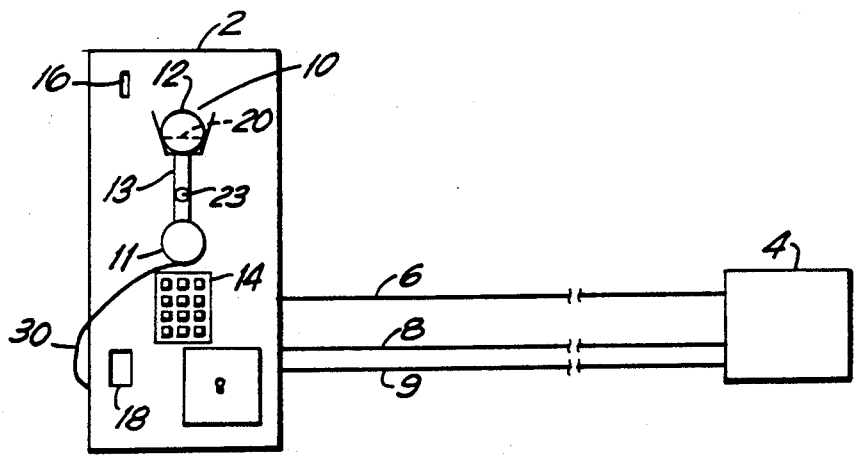
FIG. 1 illustrates a coin operated telephone connected to a central office by tip, ring and ground lines.

FIG. 1 shows a coin operated telephone 2 which is connected to a central office 4 by three phone lines. These lines are the tip, ring and ground lines 6, 8 and 9 respectively. The phone 2 includes a handset 10 having a mouthpiece 11 and an earpiece 12, which are connected by a handle 13. As will be discussed further below in connection with FIG. 2, the handset 10 is connected to the phone 2 by a cable 30. Cable 30 typically includes a plurality of wires for connecting the mouthpiece 11 and earpiece 12 to the phone 2 as well as a flexible conducting armor plating to protect the connecting wires. The phone 2 also includes a keypad 14, a coin slot 16 and a coin return slot 18.

When not in use by a customer, the handset 10 sits in a cradle 19 depressing a spring loaded switch 20. FIG. 1 depicts phone 2 with the switch 20 in its depressed or "on-hook" position. When handset 10 is lifted out of the cradle 19, the spring loaded switch 20 is no longer depressed and is in the "off-hook" position. The central office 4 applies various amplitudes and polarities of AC and DC voltages on the tip and ring lines 6 and 8, from which the telephone 2 generates its operational power when the handset 10 is off-hook.

To originate a call, a customer picks up the handset 10 to release switch 20 from its depressed position. The phone 2 enters the off-hook state and begins to draw power from the tip and ring lines 6 and 8 to process the call. The customer listens for a dial tone, and when he hears it inserts coins into coin slot 16 and dials the number he wishes to call using keypad 14. The dialed number is transmitted to the central office 4 which attempts to connect the call. If the call was connected, the customer completes the call and then replaces the handset 10 into the cradle 19. The customer's money is then collected or refunded by pay telephone 2 when a collect signal or refund signal is received from the central office 4.

When coins are deposited by a customer into a payphone, a coin acceptor directs accepted coins to a telephone escrow bucket. This escrow bucket holds the coins in escrow until completion of the time period for which the coins were deposited and then collects them based on commands from the central office 4.

Pin fraud effectively short circuits the escrow bucket, and disrupts the central office's ability to test for coin present and initial rate, and its ability to control the collect and refund functions. Specific details of how the fraud is accomplished will not be provided in the interest of preventing the further spread of this fraud. However, in general, the vandal connects the power for the handset microphone to earth ground in order to disrupt the central office's test and control functions and to perpetrate the fraud. The present invention prevents this disruption of the central office's test and control functions thereby preventing this fraud.

As has been previously described in U.S. application Ser. No. 07/199,129, the varying DC voltages and AC ringing voltage from the central office 4 are interpreted by the phone 2 as providing operational commands for controlling its operation. U.S. application Ser. No. 199,129 provides extensive details of a low power electronic control circuit and it is incorporated herein by reference. While the presently preferred embodiment of the present invention is to use it in conjunction with the circuitry shown and described in this prior application modified as shown herein and in U.S. applications Ser. Nos. 407,895 and 407,896 and filed on the same date as this application, and assigned to the assignee of the present invention, it will be manifestly clear that the present invention can also be readily applied to any payphone.

Figure 2:
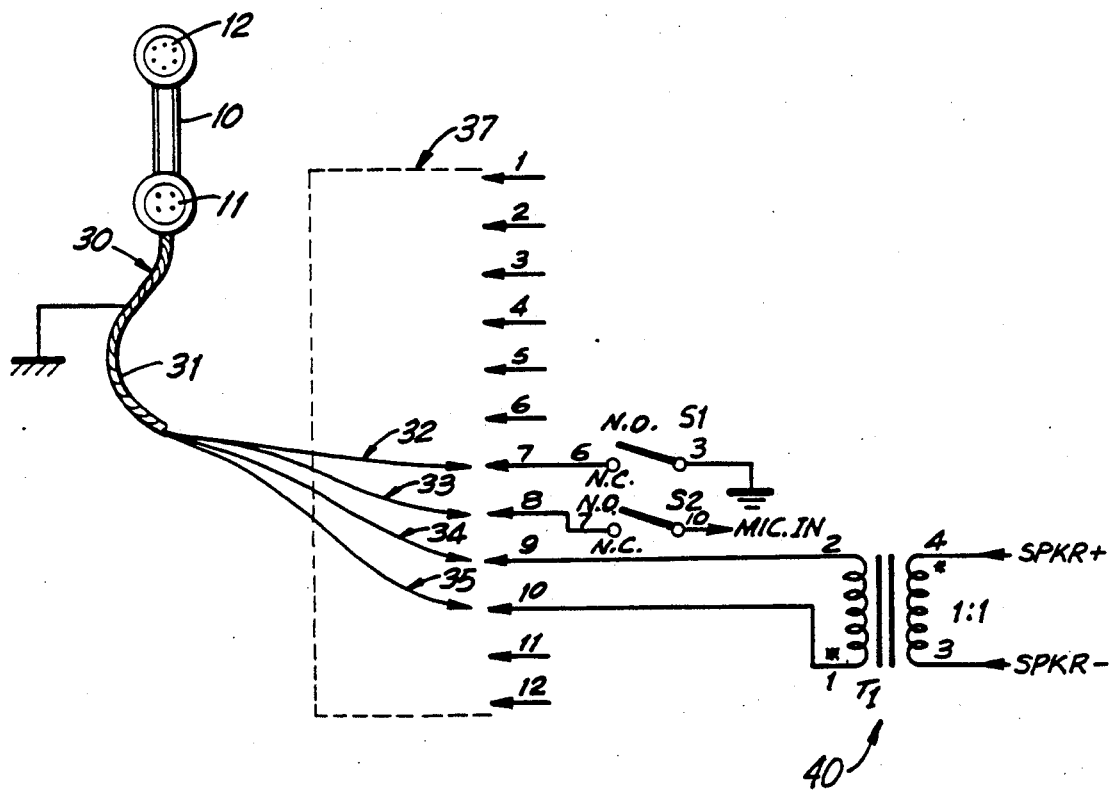
FIG. 2 illustrates in greater detail the electrical connection of the handset of the coin operated telephone of FIG. 1 both to earth ground and to circuitry for controlling the operation of the phone.

FIG. 2 illustrates the connection of the handset 10 to a POTS JACK 37 located inside the body of the coin operated telephone 2. The cable 30 includes a flexible conductive armor plating 31 which protects a plurality of wires which electrically connect the handset 10 to the telephone 2. As shown in FIG. 2, the armor plating 31 is connected to earth ground. While not shown in FIG. 2, the remainder of the chassis of payphone 2 is also connected to earth ground.

As further shown in FIG. 2, the mouthpiece 11 which includes a microphone is connected by a pair of wires 32 and 33 to pins 7 and 8 respectively of the POTS JACK 37. Pin 7 is connected through a first microphone disconnecting switch S1 to system ground. Pin 8 is connected through a second microphone disconnecting switch S2 to a MIC IN input. The earpiece 12 which includes a speaker is connected by two wires 34 and 35 to pins 9 and 10 respectively of the POTS JACK 37. Pins 9 and 10 connect the earpiece to an isolation transformer 40 which controls the output of the speaker of earpiece 12 and electrically isolates the earpiece 12 from the remainder of the electrical circuitry of telephone 2.

Figure 3:
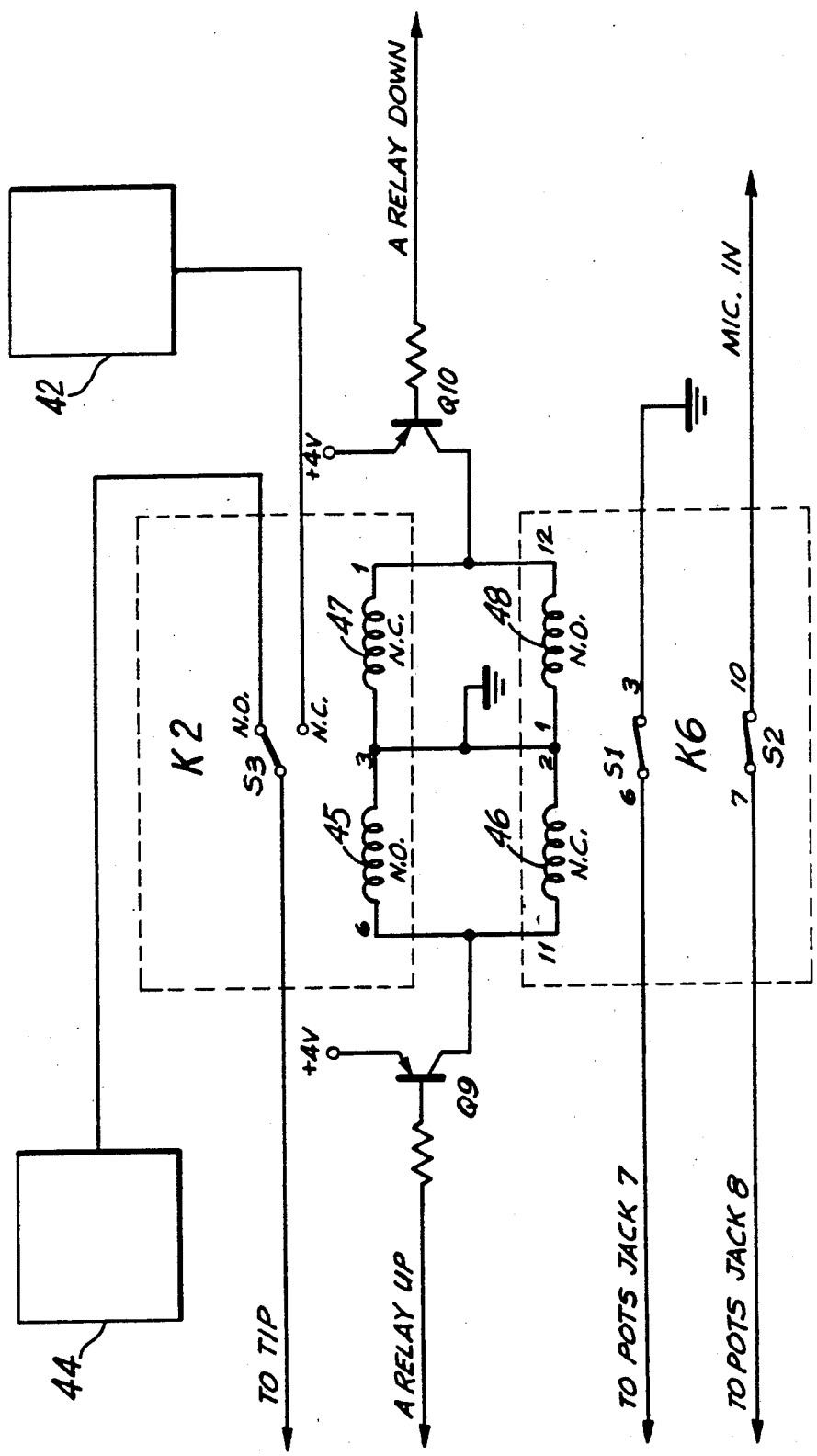
FIG. 3 is a circuit diagram illustrating one embodiment of a drive circuit for driving relay coils to synchronously control operation of the A-relay and relays for disconnecting the microphone of the handset in accord with the present invention.

In the presently preferred embodiment, both the switches S1 and S2 are relay switches which are part of a relay K6 whose control coils are shown in FIG. 3.

FIG. 3 shows additional circuit details of the preferred embodiment of the present invention. The tip line 6 supplies power to either totalizer control circuitry 42 for controlling the totalizing functions of payphone 2 including control of the escrow bucket, or to other telephone control circuitry 44, depending on the position of an "A-relay" switch S3. The microphone disconnecting switches S1 and S2, depicted in both FIGS. 2 and 3, operate synchronously with, or nearly synchronously with, the A-relay switch S3. When loop current is provided by the Central Office 4 and detected by a loop detection circuit 55 (shown in FIG. 4), a drive current is provided on line A RELAY UP biasing transistor Q9 so that current flows from +4V through Q9 and the coils 45 and 46 of the K2 and K6 relays respectively, and the A-relay switch S3 is controlled to be in its normally opened (N.O.) position, or up position, as shown in FIG. 3. At the same time, the microphone disconnecting relay switches S1 and S2 are controlled to be in their normally closed or "talk" position as a result of current flowing through coil 46 of relay K6. When a loss of loop current is detected by the loop detection circuit 55, a drive current is provided on line A RELAY DOWN to the base of transistor Q10 so that current flows from +4V through Q10 and the coils 47 and 48 of the K2 and K6 relays respectively. As a result, the A-relay S3 is controlled to be in the normally closed (N.C.), or down position, and the pay telephone is in its collect mode so that coins can be collected. When the A-relay S3 is normally closed, microphone disconnecting switches S1 and S2 are controlled to both be open so that the microphone 11 is disconnected. As a result of the microphone being disconnected during this function, the fraud path is removed from the circuit thereby allowing the collect, refund and credit checking functions of the central office to occur normally. Thus, this switching upon detection of a loss of loop current prevents the fraud.

Figure 4:
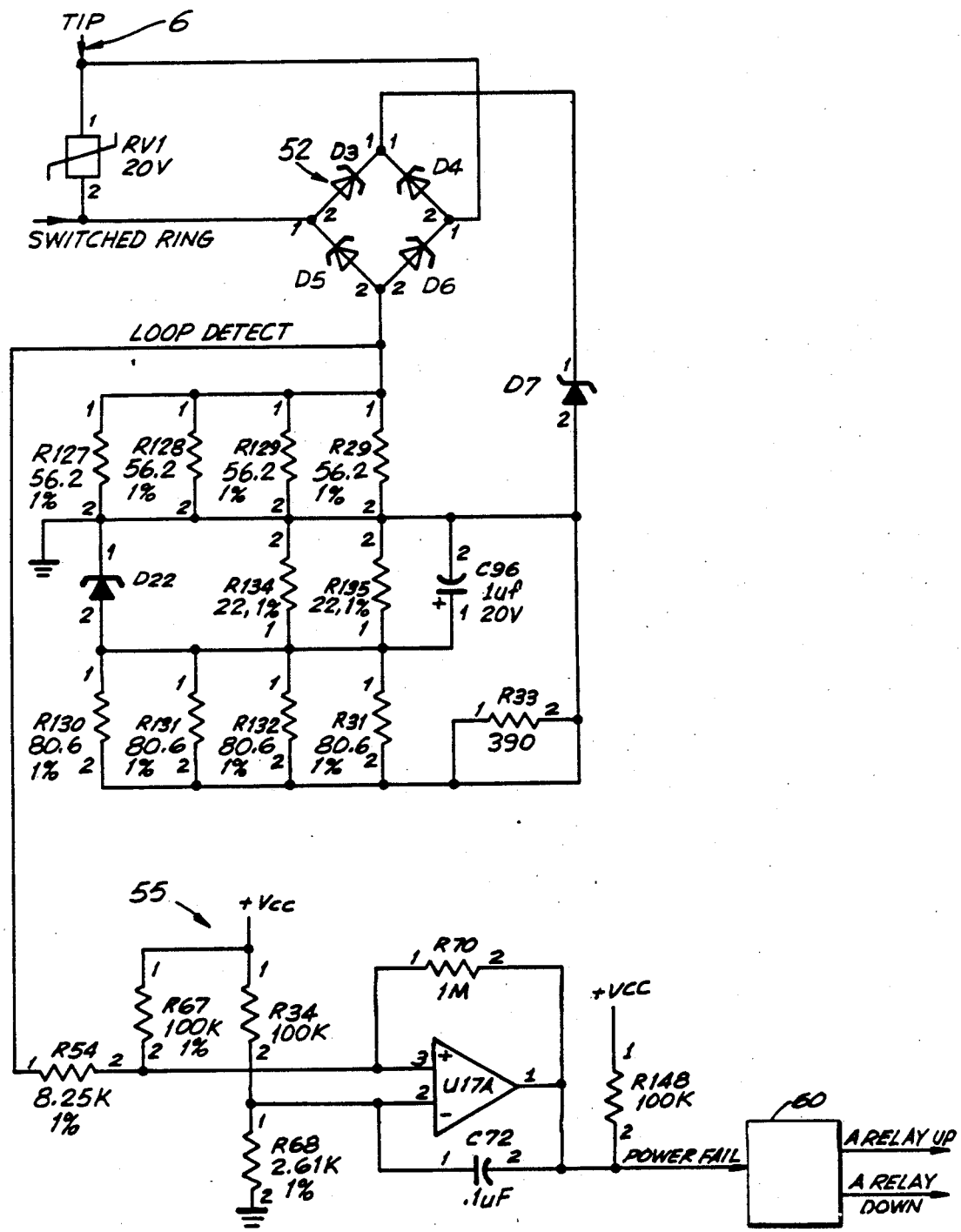
FIG. 4 is a loss of loop detection circuit which may be suitably used in the present invention.

The loss of loop current is detected by a circuit such as that of FIG. 4. While FIG. 4 shows a presently preferred loss of loop detection circuit 55, it will be recognized that other circuits could be readily employed. As shown in FIG. 4, the tip line 6 is connected to a full wave rectifier 52, consisting of diodes D3, D4, D5 and D6. Rectifier 52 is connected by a line labeled LOOP DETECT to a loss of loop detection circuit 55. When power disappears from tip line 6, the loop detection circuit 55 produces an output signal on the line labeled POWER FAIL indicative of loss of loop current. This output signal is connected to control circuitry 60 which is preferably of the type shown in U.S. application Ser. No. 07/199,129. With such circuitry, a loss of loop current will be detected when the handset 10 is on-hook, or if the central office opens the loop for a collect, refund or credit checking function. In either case, the control circuitry 60 provides an output on the A RELAY DOWN line which causes the A-relay switch S3 of FIG. 3 to move to the normally closed position and the microphone disconnecting switches S1 and S2 to open. Thus, the tip line 6 is connected to the totalizer control circuit 42 and the central office 4 can control the totalizer functions of phone 2. Also, the microphone is disconnected so the pin fraud path is opened.

Consequently, a vandal who decides to try a pin fraud can no longer make unlimited local calls as the central office 4 will not permit such a call unless the initial rate is detected. Further, a customer who picks up a telephone containing the present invention on which a pin fraud is being attempted with no wires being broken will still be able to use the phone though there will be some loss of audio fidelity.

Thus, a vandal cannot return at a later time to collect coins that have collected in the escrow bucket. In addition, if the vandal has attempted the fraud using a temporary grounding means such as a pin, and has not done too much damage to the handset, the phone will return to normal service when the pin is removed. Finally, if the handset has been permanently damaged, this damage can be readily diagnosed using a circuit such as that shown in FIG. 5 and then reported to the central office 4. Typically, if the handset is detected as missing for a predetermined time, such as 10 seconds, a hand set missing report may be automatically made.

Figure 5:
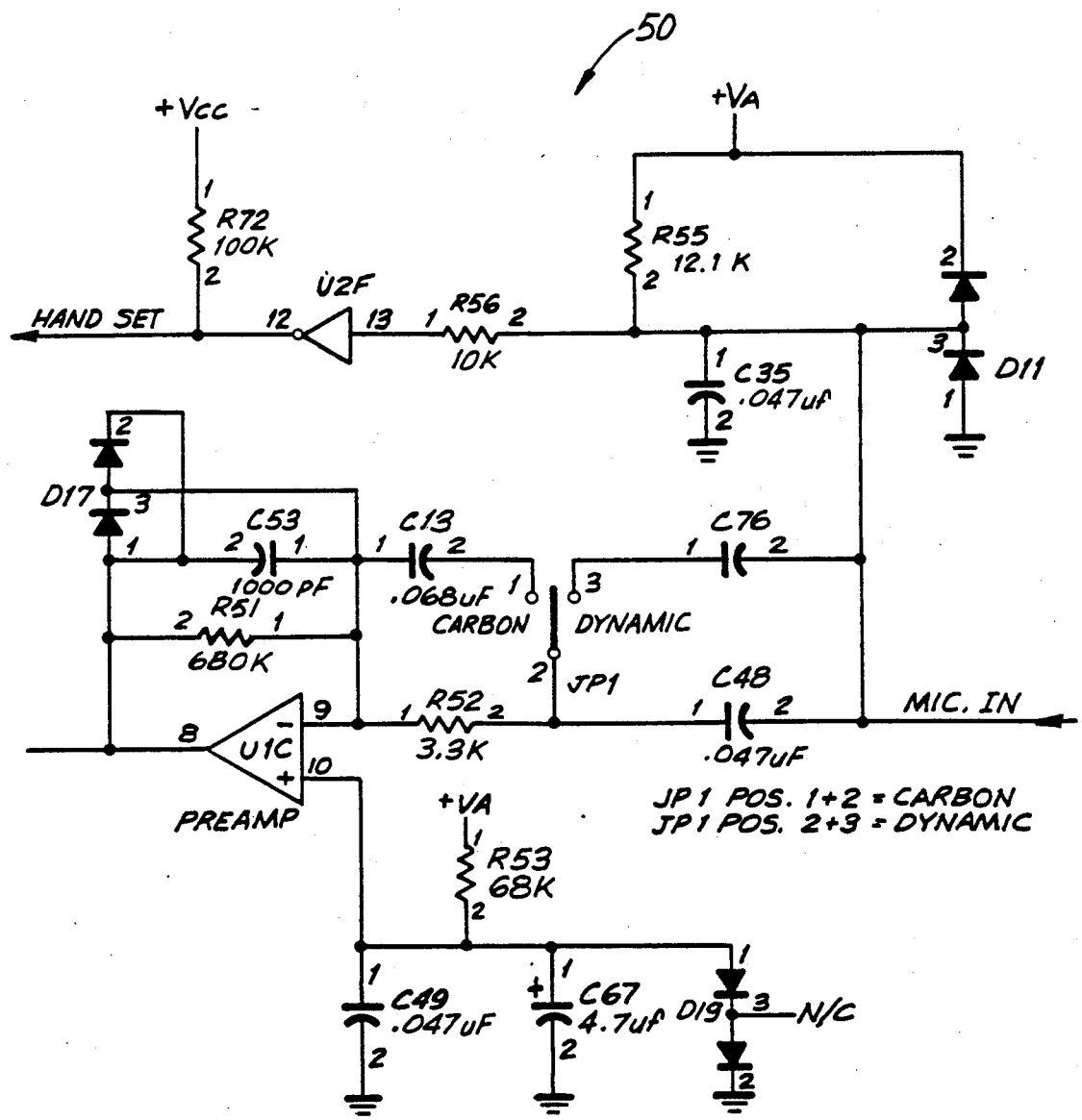
FIG. 5 is a handset missing detection circuit which may be suitably used in conjunction with the present invention.

FIG. 5 illustrates a handset detect circuit 50 for detecting the electrical disconnection of the handset 10 from the payphone 2. The circuit 50 is similar in construction and operation to the circuit 430 of FIG. 22 of U.S. application Ser. No. 07/199,129. The circuit 50 is connected to the MIC IN input of the microphone 11 and provides output signals to the control circuitry 60 (shown in FIG. 4). The circuit 50 detects whether the impedance of the microphone 11 is in the circuit or not and, therefore, detects the presence or absence of the microphone 11, without requiring extra lines. This detection is done using only a very small DC current. If the microphone 11 is present, a small current flows from source $+V_A$ (4 volts) through a resistor R55 (12.1 kilohms) and the microphone 11 to ground. When this occurs, the input to gate U2F is low and its output is high. If the microphone 11 is removed, the MIC IN input becomes an open circuit and the resistor R55 pulls the input to gate U2F high, so that the signal to the control circuitry goes low, thereby signaling a problem.

The handset removal detection circuit 50 also provides means for volume control in the earpiece 12. A pushbutton 23 (shown in FIG. 1) in the handset 10 controls the opening and closing of a switch in the handset which is in series with the microphone 11. When a caller momentarily depresses the pushbutton, this switch is opened and consequently the input to gate U2F is pulled high and its output is low. The control circuitry senses the low voltage and controls a resistance network to increase the volume in the earpiece 12.

When a pin fraud is attempted, the switches S1 and S2 are opened thus disconnecting the microphone. Consequently, the MIC IN input of handset removal detection circuit 50 becomes an open circuit as is the case when the handset 10 and connecting cable 30 were physically separated from the phone 2. Little or no current flows through the resistor R55 and a handset missing signal is produced on the line labeled HANDSET. This signal is sensed by the control circuitry 60 of FIG. 4. As a result, the central office 4 may be notified of the fraud by modem as taught in U.S. application Ser. No. 07/199,129 so that a service visit can be made to catch the perpetrator of the fraud and repair the phone if necessary in a timely fashion.

The present invention is designed to easily retrofit existing electromechanical and electronic payphones. In addition, the invention can be readily installed in payphones which used fuses, thereby eliminating the need for service calls to replace fuses.

I claim:
1. An improved coin operated telephone having a handset microphone which is connected to a main body by first and second wires which are protected by a conductive protective plating which is connected to earth ground, wherein said telephone comprises:
   a first selectively controllable switch connected between the first microphone connecting wire and system ground, said first switch connecting the microphone to ground when closed;
   a second selectively controllable switch connected between the second microphone connecting wire and a signal input, said second switch connecting the microphone to the signal input when closed; and
   means for selectively opening and closing the first and second selectively controllable switches upon detection of loss of loop current to connect and disconnect the microphone as desired.

2. The apparatus of claim 1, further comprising a selectively controllable A-relay switch for selectively switching tip line signals from either a totalizer circuit or to other phone control circuitry and, wherein the first and second selectively controllable switches and the selectively controllable A-relay switch are synchronously controlled.

3. The apparatus of claim 1, further comprising means for detecting loss of loop current.

4. The apparatus of claim 3, further comprising means for controlling the first and second selectively controllable switches so that they are both opened to disconnect the microphone upon detection of loss of loop current by the means for detecting loss of loop current.

5. The apparatus of claim 1, further comprising means for detecting that the handset or handset volume switch are open when the first and second selectively controllable switches are closed.

6. The apparatus of claim 1, wherein the first and second selectively controllable switches are relay switches.

7. The apparatus of claim 2, wherein the first and second selectively controllable switches are relay switches.

8. The apparatus of claim 7, wherein the coils of the first and second selectively controllable switches and the selectively controllable A-relay switch share a common drive circuit.

9. An improved method of operation of a coin operated telephone connected to a central office by tip, ring and ground lines and having a handset microphone which is connected to a main body by first and second wires which are protected by a conductive protective plating which is connected to earth ground, comprising the following steps:
   detecting a loss of loop current;
   electrically disconnecting the microphone from the remainder of the coin operated telephone upon detection of a loss of loop current; and
   electrically connecting the tip line to totalizer control circuitry synchronously with the step of electrically disconnecting the microphone.

10. The method of claim 9, further comprising the step of:
   electrically connecting the tip line to other telephone control circuitry and synchronously electrically connecting the microphone upon detection of deposit of the initial rate by a user to permit normal processing of the telephone call.

11. The method of claim 9, further comprising the step of:
   notifying the central office by modem of the fraud so that a service visit can be made to attempt to catch the perpetrator of the fraud or to repair the payphone if necessary.

12. A fraud prevention apparatus for retrofitting to a coin operated telephone connected to a central office by tip, ring and ground lines, and having a handset microphone which is connected to a main body by a first microphone connecting wire and a second microphone connecting wire which are protected by a conductive protective plating which is connected to earth ground, wherein said fraud prevention apparatus comprises:
   a first selectively controllable switch connected between the first microphone connecting wire and system ground, said first switch connecting the microphone to ground when closed;
   a second selectively controllable switch connected between the second microphone connecting wire and signal input, said second switch connecting the microphone to the signal input when closed;
   a third selectively controllable switch for selectively switching tip line signals to either a totalizer circuit or to other phone control circuitry;
   means for detecting loss of loop current; and
   means for controlling the opening and closing of the first and second selectively controllable switches to connect and disconnect the microphone, and for controlling the position of the third selectively controllable switch to connect tip line signals to either a totalizer circuit or to other phone control circuitry.

13. The apparatus of claim 12, wherein the first and second selectively controllable switches are synchronously or substantially synchronously controlled to operate with the third selectively controllable switch.

14. The apparatus of claim 13, wherein the first and second selectively controllable switches share a common drive circuit with the third selectively controllable switch.

15. The apparatus of claim 13, wherein the first, second and third selectively controllable switches are relay switches.

16. The apparatus of claim 12, wherein the means for selectively controlling the first, second and third selectively controllable switches operates to open the first and second selectively controllable switches to disconnect the microphone and operates to close the third selectively controllable switch to connect the totalizer control circuitry to the tip line upon detection of loss of loop current.

17. The apparatus of claim 16, wherein the means for controlling the first, second and third selectively controllable switches operates to close the first and second controllable switches to connect the microphone, and operates to position the third selectively controllable switch to connect the telephone control circuitry to the tip line to permit telephone call processing upon detection of loop current or of deposit of the initial rate.

18. The apparatus of claim 12, further comprising means for detecting that the handset volume switch is open when the first and second selectively controllable switches are closed.

* * * * *